(12) United States Patent
Afshari (10) Patent No.: US 6,577,962 B1
(45) Date of Patent: Jun. 10, 2003

(54) SYSTEM AND METHOD FOR FORECASTING ENERGY USAGE LOAD (75) Inventor: Afshin Afshari, San Jose, CA (US)

(73) Assignee: Silicon Energy, Inc., Alameda, CA (US)

( * ) Notice: Subject to any disclaimer, the term of this patent is extended or adjusted under 35 U.S.C. 154(b) by 0 days.

(21) Appl. No.: 09/676,299

(22) Filed: Sep. 28, 2000

(51) Int. Cl.⁷ .............................................. G06F 17/60
(52) U.S. Cl. ............................. 702/61; 702/60; 702/62; 700/291
(58) Field of Search ..................... 702/61, 57, 60, 702/62, 64, 183, 188, 196, 130, 136, FOR 103, FOR 104, FOR 106, FOR 111, FOR 112, FOR 114, FOR 134, FOR 135, FOR 170, FOR 142; 324/103 R, 116, 141, 142; 307/38, 39, 126; 340/870.02, 870.16, 870.17; 705/412, 10; 700/291, 295–297; 703/3, 4; 706/45

(56) References Cited

U.S. PATENT DOCUMENTS

| | | | | |
|---|---|---|---|---|
| 4,551,812 A | | 11/1985 | Gurr et al. ................... 364/492 |
| 5,216,623 A | | 6/1993 | Barrett et al. ................ 364/550 |
| 5,404,136 A | | 4/1995 | Marsden ................. 340/870.03 |
| 5,566,084 A | * | 10/1996 | Cmar .......................... 705/412 |
| 5,572,438 A | | 11/1996 | Ehlers et al. ................ 364/492 |
| 5,576,700 A | | 11/1996 | Davis et al. ............ 340/825.16 |
| 5,696,695 A | | 12/1997 | Ehlers et al. ................ 364/492 |
| 5,706,191 A | | 1/1998 | Bassett et al. ............... 364/138 |
| 5,729,474 A | | 3/1998 | Hildebrand et al. ......... 364/557 |
| 5,732,193 A | * | 3/1998 | Aberson ....................... 706/45 |
| 5,761,083 A | | 6/1998 | Brown, Jr. et al. ......... 364/492 |
| 5,793,974 A | | 8/1998 | Messinger ............. 395/200.54 |
| 5,794,212 A | | 8/1998 | Mistr, Jr. ....................... 705/26 |
| 5,924,486 A | * | 7/1999 | Ehlers et al. .................. 307/39 |
| 5,958,012 A | | 9/1999 | Battat et al. ................. 709/224 |
| 5,974,403 A | * | 10/1999 | Takriti et al. ................. 705/10 |
| 6,021,402 A | * | 2/2000 | Takriti ......................... 705/412 |
| 6,088,659 A | | 7/2000 | Kelley et al. ................. 702/62 |
| 6,105,000 A | * | 8/2000 | Hickman et al. ............. 705/10 |
| 6,178,362 B1 | * | 1/2001 | Woolard et al. ............ 700/295 |

OTHER PUBLICATIONS

NETO: "Distribution by demand side management"; Transmission & Distribution World, Dec. 1997, vol. 49, No. 13, pp. 1–4, see entire article.

* cited by examiner

Primary Examiner—Hal Wachsman
(74) Attorney, Agent, or Firm—Gray Cary Ware Freidenrich LLP (57) ABSTRACT A system and method for forecasting energy usage load for a facility includes a server having a load forecasting application, which includes 1) a parameter identification module for determining periodic energy load usage of the facility and 2) a load prediction module for generating energy usage load forecast profiles for the facility. The load forecasting application may include a database for storing information and a report module for generating energy usage load forecast profiles. The database may include a first set of matrices associated with the parameter identification module for storing periodic energy usage load parameter information, and a second set of matrices associated with the load prediction module for storing energy usage prediction information. The first set of matrices may include a matrix for storing coefficients for determining periodic changes in energy load usage, and a model parameter matrix for storing load parameter information.

19 Claims, 4 Drawing Sheets

SYSTEM AND METHOD FOR FORECASTING ENERGY USAGE LOAD

The present invention relates to forecasting the energy usage load of an entity.

BACKGROUND OF THE INVENTION

Energy load forecasting is an important function for most facilities. Whether large or small, most facilities include devices that utilize energy, such as electrical equipment, heating and cooling systems, and the like. The amount of energy utilized by such systems may vary depending on external factors, such as the severity and degree of the outside air temperature (hot or cold), the type of weather pattern being experienced, the internal load, the need for running multiple systems in the facility, etc.

Since energy usage can vary significantly depending on such internal and external factors and the cost of purchasing energy from a provider can be quite expensive, it is beneficial for facilities to be able to anticipate future energy usage so they can better manage their energy usage and control costs. Conventional methods for determining load forecasting typically involve off-line processing of large amounts of data using standard linear regression or neural network modeling. The resulting forecasting models are then utilized in real-time. Unfortunately, conventional methods are disadvantageous in that they are not capable of adapting the forecasting model to changing operational conditions. Instead, incremental improvement of the model requires off-line reprocessing of the entire set of available data and then recalculating forecasting models. Unfortunately, off-line reprocessing requires system downtime to update the forecasting models appropriately. As a result, facilities generally cannot receive up-to-date forecasting information as needed to adequately manage energy usage and control costs.

Additionally, existing load forecasting systems are primarily used by utilities for predicting aggregate energy load (i.e., the energy load of a region or a market sector). Site-level load forecasting presents more variability than aggregate load forecasting, and as a result, conventional load forecasting systems are generally incapable of predicting site-level load forecasts because they cannot adapt to variable changing conditions in real-time so that the forecasts do not change based on changing conditions.

Thus, there is a need for a system and method that can adapt to variable changing conditions in real-time to provide adaptable, real-time load forecasting and it is to this end that the present invention is directed.

SUMMARY OF THE INVENTION

The present invention affords a system and method for forecasting energy usage load for a facility. In an aspect of the invention, the system includes a server having a load forecasting application running thereon for forecasting energy usage load for the facility. The load forecasting application includes a parameter identification module for determining periodic energy load usage of the facility and a load prediction module for generating energy usage load forecast profiles for the facility. A database may be associated with the server for storing load forecasting information therein. The load forecasting application may also include a report module for enabling the generating and viewing of energy usage load forecast profiles.

In more detail, the database may include respective sets of matrices associated with the parameter identification module and the load prediction module. The respective sets of matrices may include a first set of matrices associated with the parameter identification module for storing periodic energy usage load parameter information, and a second set of matrices associated with the load prediction module for storing energy usage prediction information. The first set of matrices may include an information matrix for storing update coefficients for determining periodic changes in energy load usage, and a model parameter matrix for storing load parameter information for determining energy usage load forecast profiles. Advantageously, energy load usage may be determined hourly.

In other aspects of the invention, the database may also include a forecast table for relating main forecast points, indicating existing metered load points for which an energy usage load forecast profile can be generated, with respective dependent forecast points. The database may also include a weather information database for storing weather forecast information, and a forecast history database for storing historical forecast profile information.

In another aspect of the invention, a method for forecasting energy usage load for a facility for a selected forecast day includes the steps of generating a forecast table for relating main forecast points for which an energy usage load forecast profile can be generated, with respective dependent forecast points that can be used to determine an energy usage load forecast profile for the facility; retrieving a prior temperature profile for the facility; retrieving minimum and maximum temperature measurements for the selected forecast day; retrieving periodic energy usage load information for the facility; and generating an energy usage load forecast profile for the facility for the selected forecast day. Further, the forecast profile may be adjusted so that its average is similar to that of the calculated average temperature of the selected forecast day. Advantageously, periodic energy usage load information may be updated hourly.

In more detail, the updating step includes the steps of retrieving current energy usage load information for the facility and retrieving current temperature information; determining the effect of measured weather-related perturbations on predicted energy load usage for the facility for the selected forecast day; retrieving historical parameter information relating to prior periodic energy usage load information for the facility; and updating the periodic energy usage load information for the facility with current energy usage load information for the facility.

DETAILED DESCRIPTION OF THE PREFERRED EMBODIMENT

Figure 1:
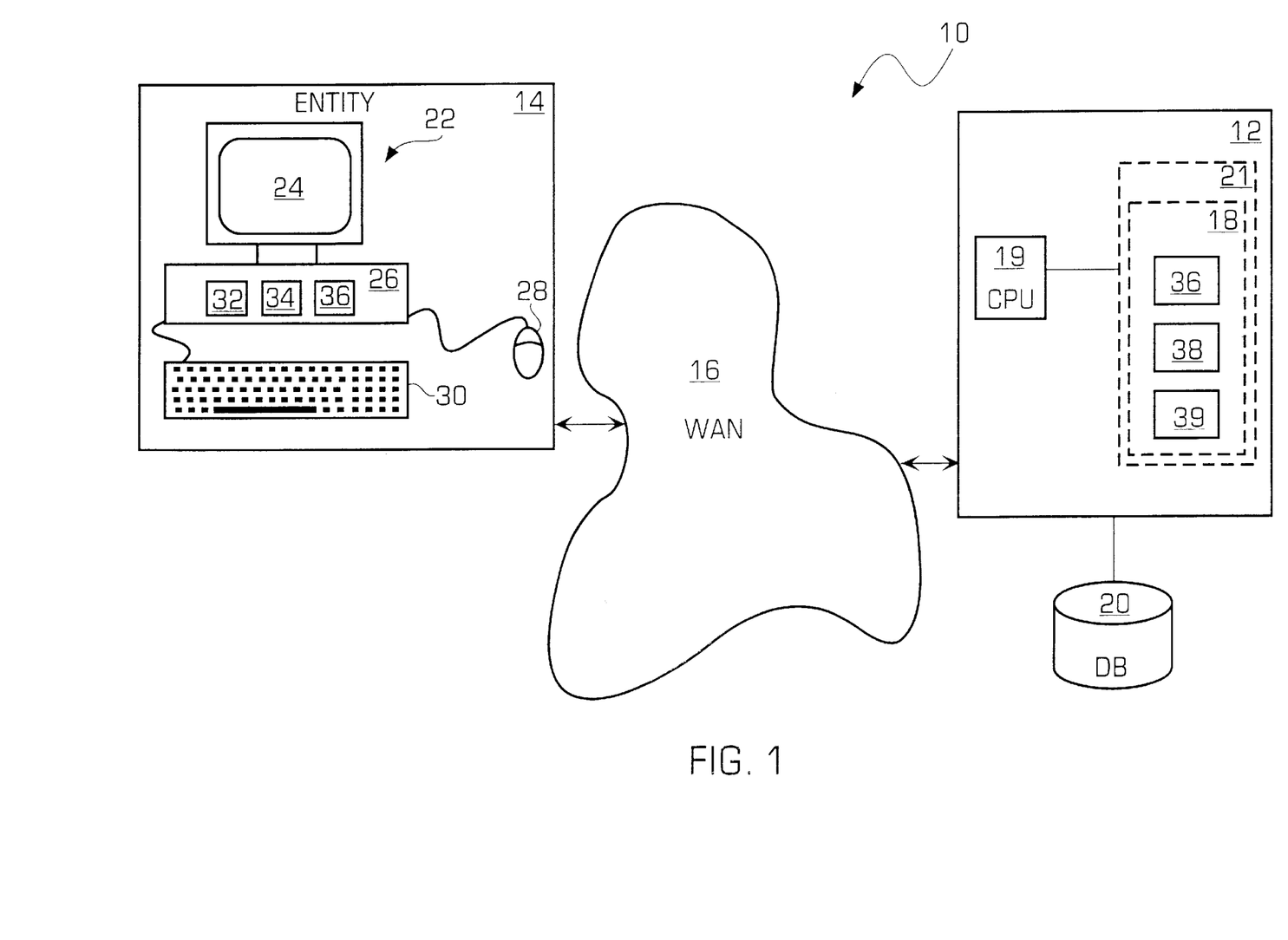
FIG. 1 is a diagram illustrating a load forecasting system in accordance with the invention.

FIG. 1 is a diagram illustrating a load forecasting system 10 in accordance with the invention. As shown, the load forecasting system 10 may include a server 12 connected with one or more client nodes 14 across a wide area network (WAN) 16, such as the Internet, or more particularly, the World Wide Web. It should be noted that while the invention is described as being provided over the World Wide Web, it may also be provided over a local area network, such as an intranet, and other network structures.

The server 12 may include a software application 18, that is executed by a CPU 19 of the server and that is stored on a memory 21 of the server, for performing load forecasting within the network. A database 20 may be associated with the server 12 and may include a plurality of database tables for storing load forecasting information. The client nodes 14 may be associated with respective entities, such as a single building, a collection of geographically contiguous buildings of a company, or geographically separate buildings of a company.

The server 12 may be accessed by one or more client computer systems 22 at each client node 14 over the WAN 16 using a typical protocol, such as HTTP or HTTPS. Each client computer system 22 may include a display device 24, a chassis 26, one or more user input devices, such as a mouse 28 and a keyboard 30, and may be configured to communicate with the server 12 over the WAN 16. The chassis 26 may house a permanent storage system 32, such as a hard disk drive, optical disk drive, tape drive, or the like, which may store one or more software applications such as a web browser application. The client computer system 22 may have a resident memory 34 and the software application from the disk 32 may be transferred to the memory 34 to be executed by a CPU 36. A browser application may connect the client computer system 22 to the server 12 over the WAN 16 and receive data and graphical information (such as web pages, reports, etc.) that may be displayed on the display device 24 of the client computer system 22. The browser application may also permit the client computer systems 22 to interact with the server 12, such as for performing load forecasting operations.

As described above, the server 12 may include a software application 18 for performing load forecasting within the network. In accordance with the invention, the software application 18 may include a parameter identification module 36 (for determining daily load updates) and a load prediction module 38 (for generating forecast profiles). Respective sets of database tables (matrices shown in FIG. 2) may be associated with each of the modules 36, 38. In operation, the parameter identification module 36 may update a first set of database tables (matrices) within the database 20, as will be described below, for determining hourly energy usage load information within the system. Similarly, the load prediction module 38 may update a second set of database tables (matrices) in the database 20, as will be described below, for predicting future energy usage load within the system. The software application 18 may also include a reporting module 39 for enabling a user to generate and view forecast profiles, as will be described in more detail below.

Advantageously, the system 10 may receive weather forecast information and based on the weather forecast information, may generate load forecasting information (forecast profiles) so that the facilities can use such profiles to effectively manage energy usage and control costs.

Examples of weather forecast information that may be utilized by the system include outdoor air temperature information (i.e., wet bulb and/or dry bulb temperature), and future predicted weather forecasts. Preferably, outdoor air temperature and humidity information may be determined from reports generated by a Building Control System; however, such information may be determined based on standard weather reporting services, such as the National Weather Service, for example.

Air temperature is a measure of the heat content of air. For example, three different measurements may be generally used to determine the current air temperature: dry bulb temperature, wet bulb temperature, and dew point temperature. Dry bulb temperature is a measurement of the air temperature as determined by an ordinary thermometer and is generally referred to in standard weather reports. Wet bulb temperature reflects the cooling effect of evaporating water. Wet bulb temperature can be determined, for example, by passing air over a thermometer that has been wrapped with a small amount of moist cloth. The cooling effect of the evaporating water causes a lower temperature compared to the dry bulb air temperature described above. Dew point temperature is the temperature below which moisture will condense out of air. Air that is holding as much water vapor as possible is considered to be saturated, or at its dew point. Water therefore will condense on a surface, such as a building wall, for example, that is at or below the dew point temperature of the air. Using such information, either alone or in combination, the present invention can predict energy load usage within the system.

Figure 2:
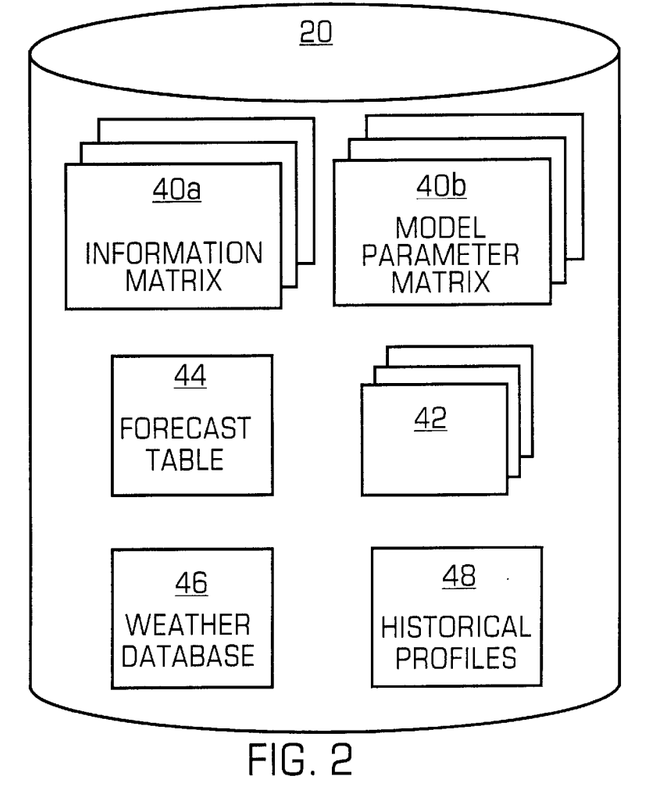
FIG. 2 is a diagram illustrating the database shown in FIG. 1.

FIG. 2 is a diagram illustrating more details of the database 20 shown in FIG. 1. As shown in FIG. 2 and described above, the database 20 may include respective database tables (matrices) for storing load forecast information in accordance with the invention. The database 20 may include a first set of database tables 40a, 40b that may be associated with the parameter identification module 36 (FIG. 1) and a second set of database tables 42 that may be associated with the load prediction module 38 (FIG. 1). Preferably, database table 40a may be a 24×3×3×3 matrix (information matrix) for storing update coefficients used to adjust load model parameters within the system. Similarly, database table 40b may be a 24×3×3 matrix (model parameter matrix) for storing information used to generate an energy usage load forecast. Those skilled in the art will recognize that other sized matrices may be utilized without departing from the invention.

The database 20 may also include a forecast table 44 for relating main forecast points with respective dependent forecast points. A main forecast point is an existing metered load point for which an energy usage forecast may be generated. Dependent forecast points are those that are associated with respective main forecast points and include a calculated forecast point (indicating load as predicted by the forecasting module), an hourly weather point (indicating hourly temperatures for a location of interest), and forecast weather points (indicating minimum and maximum future temperature forecasts). The database 20 may also include a table 46 for storing weather information and a table 48 for storing historical forecast information. Other information may also be stored in the database 20. To perform load forecasting in accordance with the invention, the system may perform several routine tasks, such as initializing the matrices, selecting relevant meteorological station(s) for receiving weather forecast information to perform load forecasting, and determining appropriate bias correction factors for adjusting load forecast information depending on the means employed to determine temperature measurement parameters. These tasks will be described in more detail below.

Initializing the matrices may involve setting the 72 3×3 information tables equal to the identity matrix, while the 3 24×3 model parameter tables may be initially estimated using either historical weather/load data, or average (typical) values.

The forecasting system and method in accordance with the invention is driven by external temperature and time-dependent activities, such as occupancy and production rate. The update coefficients (load model parameters) relating the load to the driving variables need to be initialized. The initial values do not need to be accurate since the forecasting system in accordance with the invention has an auto-adaptive feature wherein the coefficients are tuned based on the actual operation conditions. The coefficients in accordance with the invention may be initialed in three different ways.

The typical method for initializing the coefficients consists of using historical interval load data provided by the customer for generating site-specific coefficients. In this method, four to six months of load and weather data (necessarily including several cooling months) must be provided. In typical forecasting system, the data is processed off-line and the resulting initialization set of coefficients is sent to the customer site. The forecasting system in accordance with the invention may use the above typical initialization method.

An alternative method for initialization consists of using a set of "average" coefficients. The average coefficients have been pre-calculated for a particular building and a particular usage pattern (e.g., such as for a 20 floor office building with a 1264 ton chiller). The system in accordance with the invention then learns the true values corresponding to the actual building characteristics within a few months when the actual building is comparable to the one used for the average values. This initialization method offers the advantage of not requiring field data. Another alternative initialization method involves generating the initial coefficients based on the customer's monthly billing data and the building characteristics. Both of these alternative initializations methods may also be used.

Bias correction factors may be determined by the system as appropriate in order to predict precise load forecasts. For example, when local weather measurements are available, the differential between past National Weather Service forecasts, and observed local values may be used continuously for correcting the National Weather Service predictions.

Figure 3:
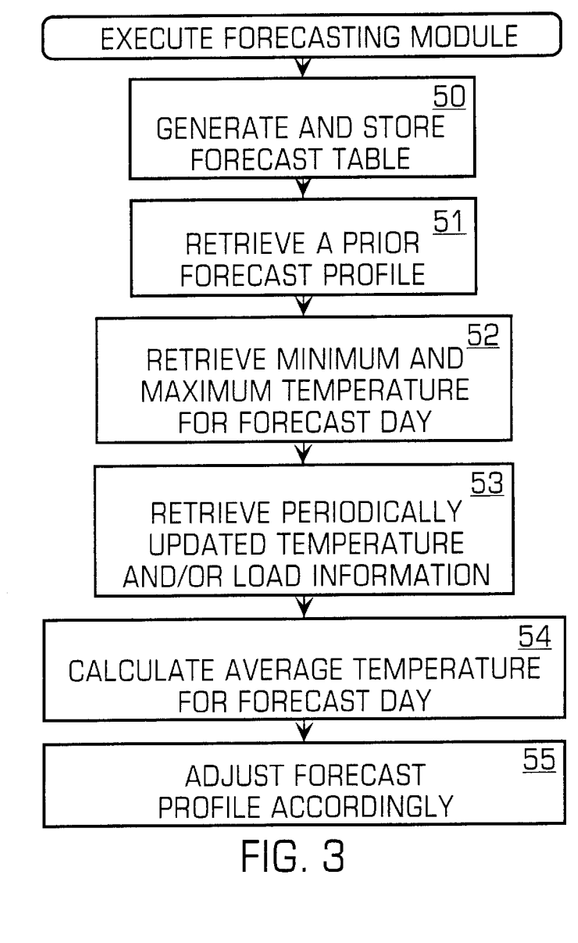
FIG. 3 is a flowchart illustrating a preferred operation of the system in accordance with the invention.

Operation of the forecasting software module 18 (FIG. 1) will now be generally described with reference to FIG. 3. Executing the forecasting software module 18 (FIG. 1) causes the parameter identification module 36 and the load prediction module 38 to be executed. Preferably, the modules 36, 38 are executed in parallel. Upon executing the forecasting software module 18, a forecast table 44 may be generated by the system and stored in the database 20 (Step 50). The system may also retrieve a prior forecast profile (i.e., a previous day's forecast profile) from the database 20 (Step 51), and retrieve the forecast day's (i.e., today, tomorrow, day after tomorrow) minimum and maximum temperatures from the database 20 (Step 52). In order to retrieve the forecast day's minimum and maximum temperatures, the system may access a database table indicating current and historical weather temperature information. Depending on the forecast day (i.e., today, tomorrow, or day after tomorrow), different temperature information may be retrieved from the database table for predicting forecast profiles. Thus, the system learns and adapts to changing conditions so that the forecasts are current.

The system may also retrieve periodically updated, such as hourly, data (i.e., temperature and/or load information) from the database 20 (Step 53), calculate the forecast day's average temperature (Step 54), and adjust the forecast profile as needed (i.e., adjust the forecast profile so that its average is similar to that of the forecast day's average) (Step 55).

Since weather conditions can be quite volatile, energy usage load for a particular day may depend on whether the day is particularly cold or hot. Cold and hot days may be respectively characterized by the system according to the following relationships:

$$D_c = \max\{0, T_{ext} - T_{ref}\}$$
$$D_h = \max\{0, T_{ref} - T_{ext}\} \quad (1)$$

where $T_{ext}$ is the external temperature and $T_{ref}$ is a reference temperature that distinguishes cool and hot days. Ideally, energy usage load may be determined as a linear function of $D_c$ and $D_h$, as follows:

$$\begin{cases} e = a + bD_c + cD_h = \theta^T \Phi \\ \theta = [\,a \quad b \quad c\,]^T \\ \Phi = [\,1 \quad D_c \quad D_h\,]^T \end{cases} \quad (2)$$

where a is the base load (the part of the load that is not temperature dependant), b is the cooling slope (the rate of air temperature cooling over time), c is the heating slope (the rate of air temperature heating over time), θ is a parameter vector and Φ is a vector of measured weather-related perturbations.

In accordance with the invention, as measured load data becomes available, by comparing measured load data with model prediction information, the system may refine the model parameters in real-time, without requiring any off-line reprocessing to provide real-time, adaptive forecasting. For example, the following algorithm may be used to update the estimated parameter vector θ:

$$\begin{cases} \theta(t) = \theta(t-1) + P(t)\Phi(t)\{e(t) - \theta^T(t-1)\Phi(t)\} \\ P(t) = P(t-1) - \dfrac{P(t-1)\Phi(t)\Phi^T(t)P(t-1)}{1 + \Phi^T(t)P(t-1)\Phi(t)} \end{cases} \quad (3)$$

where P represents the information matrix (database table 40a).

Since a different set of model parameter information may be stored for each day type (i.e., weekdays, weekends, and holidays) and hour of the day, the numerical model (2) indicated above may be implemented by the system according to the following model:

$$e(t) = a_{ij} + b_{ij} D_c(t) + c_{ij} D_h(t) \quad (4)$$

where i is the day type index (i.e., 1 for weekdays, 2 for Saturdays, 3 for Sundays and holidays), and j is the hour-of-day index (i.e., 1,2, . . . , 24). When model parameters are updated by the system, such as occurring at update time t (which falls in day type, i, and hour-of-day, j), the information matrix $P_{ij}$ and the parameter set $\theta_{ij}$ may be updated according to the following algorithm:

$$\begin{cases} \theta_{ij}(new) = \theta_{ij}(old) + P_{ij}(new)\Phi(t)\{e(t) - \theta_{ij}^T(old)\Phi(t)\} \\ P_{ij}(new) = P_{ij}(old) - \dfrac{P_{ij}(old)\Phi(t)\Phi^T(t)P_{ij}(old)}{1 + \Phi^T(t)P_{ij}(old)\Phi(t)} \end{cases} \quad (5)$$

where e and Φ are measured values at time t. As a result, at a given time t, the 3×24 instances of the 3×1 vector Φ and the 3×24 instances of the 3×3 matrix P may be stored by the system in the appropriate database tables. The resulting P values may be used by the parameter identification module 36 as update coefficients used to perform hourly load usage updating functions, while the resulting θ values may be used by the load prediction module 38 to generate energy usage load forecast information when a forecast profile is requested. As model parameters become updated by the system in real-time, preferably the prior P values stored in the system are overwritten by the current P values.

Figure 4:
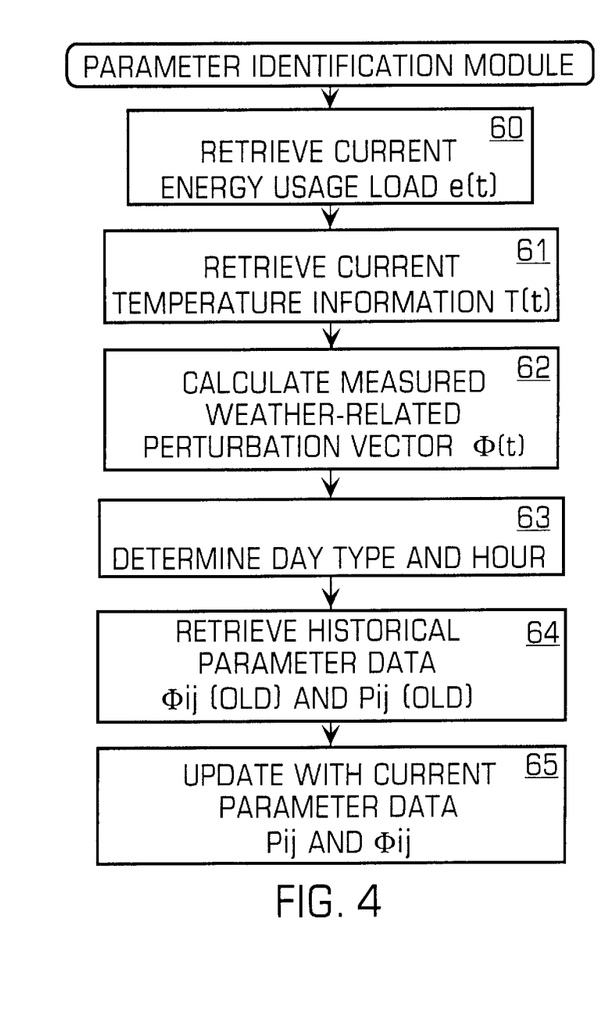
FIG. 4 is a flowchart illustrating a preferred operation of the parameter identification module of the forecasting software module shown in FIG. 1 in accordance with the invention.

To generate hourly data in accordance with the invention, the parameter identification module 36 may perform the following steps as shown in FIG. 4. First, the current load e(t) may be retrieved from the system database 20 (Step 60), and the current temperature T(t) may be retrieved from the weather database 46 (Step 61). Then, the system may calculate Φ(t) (the vector of measured weather-related perturbations) (Step 62), and determine the current day type, i, and the current hour of the day, j (Step 63). Finally, the system may retrieve historical parameter data ($\theta_{ij}$(old) and $P_{ij}$(old)) from the parameter database 48 (Step 64), and update current values for $P_{ij}$ and $\theta_{ij}$ accordingly (Step 65). A preferred operation of the parameter identification module 36 described above is shown in FIG. 4.

The load prediction module 38 is preferably executed on a daily period; however, those skilled in the art will recognize that other periods may be established without departing from the invention. Operation of the load prediction module 38 will now be described with reference to FIG. 5. In accordance with the invention, the load prediction module 38 may generate an external temperature prediction for the forecast period (i.e., today, tomorrow, or the day after tomorrow), and the load model described above may be invoked to forecast the load. To generate an external temperature prediction, a prior temperature profile may be utilized by the system. The prior temperature profile may be adjusted accordingly, for example using minimum and maximum temperatures occurring during the forecast period, thereby resulting in a prediction of the temperature profile over the forecast period. Accordingly, forecast load may be generated by executing the load model described above (equation 2) over the forecast period.

Figure 5:
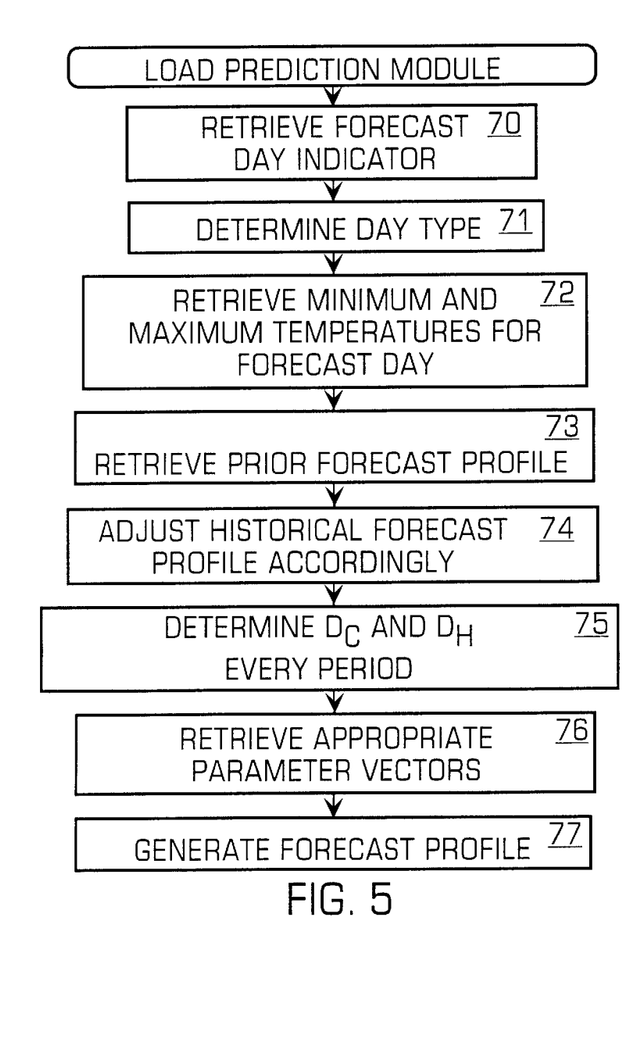
FIG. 5 is a flowchart illustrating a preferred operation of the load prediction module of the forecasting software module shown in FIG. 1 in accordance with the invention.

Referring to FIG. 5, to forecast load, the load prediction module 38 may perform the following steps. First, the system may retrieve a forecast day indicator (Step 70), and determine the current day type (Step 71). The system may then retrieve minimum and maximum temperatures for the forecast day indicator from the forecast weather database 46 (Step 72), retrieve a prior profile from the historical weather database 48 (Step 73), and adjust the historical profile accordingly (Step 74). For each hour, the system may determine $D_c$ and $D_h$ values (Step 75), retrieve the appropriate parameter vectors from the parameter database table 40a, 40b (Step 76), and estimate energy usage load accordingly (Step 77) to generate a forecast load profile.

As described above, the software application 18 (FIG. 1) may include a reporting.module 39 for enabling a user to generate and view forecast profiles. Advantageously, these forecast profiles may be customizable depending on the desired reporting parameters. Preferably, reports may display pre-defined main forecast points, although those skilled in the art will recognize that other report displays may be practiced without departing from the invention. While energy load usage forecasts (forecast profiles) may be generated by the system at predetermined times, a user may control the generation of forecasts by selecting a forecast format (i.e., today, tomorrow, day after tomorrow) from a displayed user interface which is described below. Selecting a forecast format causes the forecasting software module 18 to execute the parameter identification module 36 and load prediction module 38 to generate a new forecast profile as described above. The forecast may be displayed to the user for viewing or for data logging purposes, i.e. exporting, etc.

Figure 6:
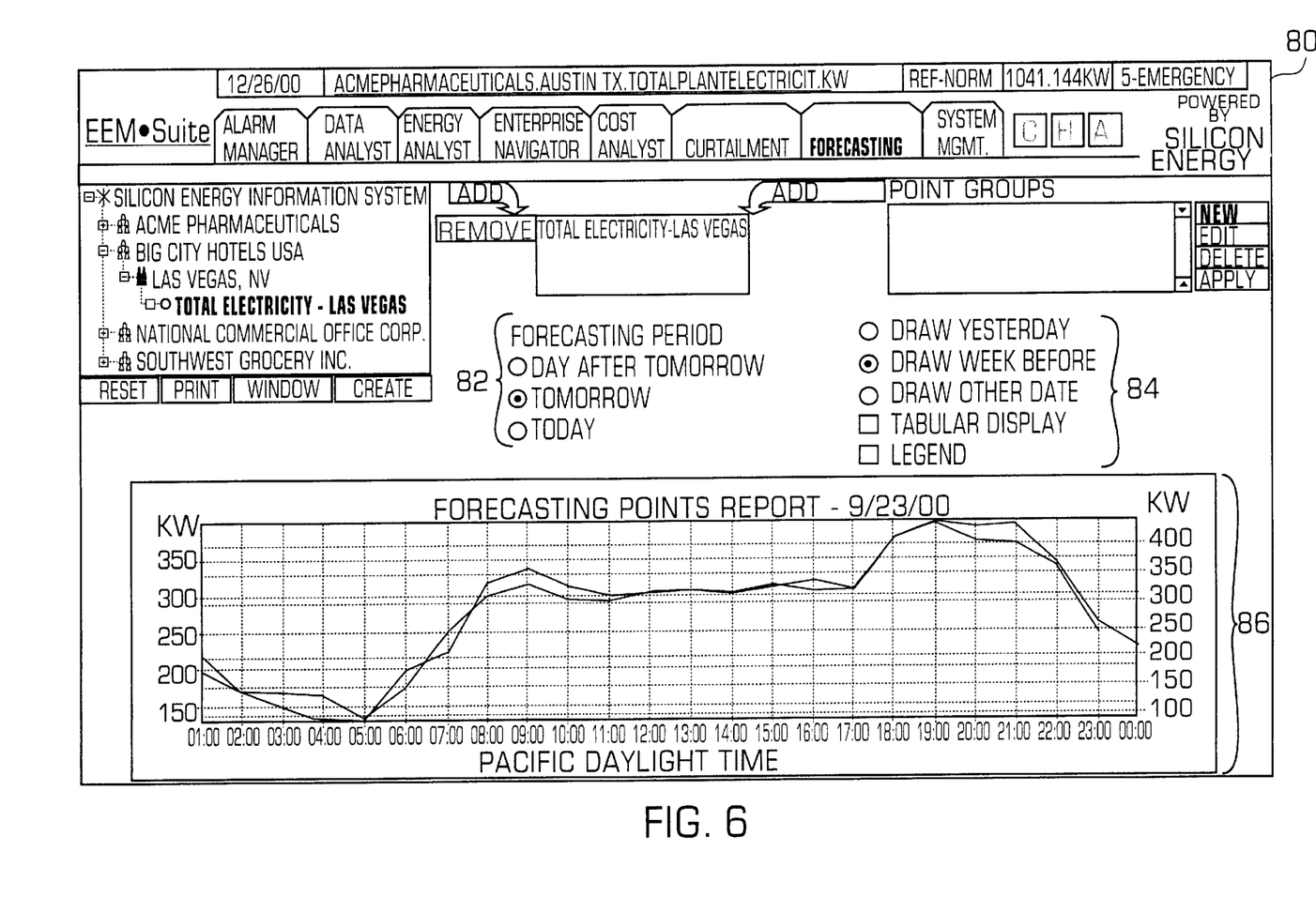
FIG. 6 is an exemplary representation of a user interface that may be displayed to a user showing an energy usage forecast.

FIG. 6 is an exemplary representation of a user interface 80 that may be displayed to a user indicating a resulting forecast profile. As shown in FIG. 6, the user interface 80 may include a first area 82 enabling a user to select from different forecasting periods, such as "Today," "Tomorrow," and "Day After Tomorrow." Selecting different forecasting periods may cause the system to recalculate the energy load usage forecast. The user interface 80 may also include a second area 84 permitting the user to select from different historical data to be included in the forecasting report. For example, energy load usage data from a prior day, a prior week, or other specific day, may be included in the forecasting report. Forecast data may be indicated graphically (in a third area 86) on the user interface 80 and may also graphically indicate any selected historical energy load usage data as described above. Advantageously, multiple forecast points may be selected when determining an energy load usage forecast. Thus, a user may generate and view energy load forecasts in real-time using the present invention affording a facility a forecast profile reference that can be used to effectively manage energy usage and control costs.

While the foregoing has been described with reference to particular embodiments of the invention, such as a system for determining energy load usage forecast profiles, the invention is not limited to such embodiments and may be applicable to any system capable of performing the described advantages. It will be appreciated by those skilled in the art that changes in these embodiments may be made without departing from the principles and spirit of the invention. Additionally, while the system has been described herein as implementing particular algorithms for performing forecast profile determination, those skilled in the art will recognize that the above described algorithms are exemplary and that other algorithms may be utilized without departing from the invention.

What is claimed is:

1. A system for forecasting energy usage load for a facility, comprising:
    a server having a load forecasting application running thereon, the load forecasting application including:
        a parameter identification module for determining periodic energy load usage of the facility, and
        a load prediction module for generating energy usage load forecast profiles for the facility in a real-time adaptive manner to provide real-time forecasting for the facility; and
        a database associated with the server for storing load forecasting information therein,
    wherein the database includes respective sets of matrices associated with the parameter identification module and the load prediction module.

2. The system of claim 1, wherein the respective sets of matrices include a first set of matrices associated with the parameter identification module for storing periodic energy usage load parameter information, and a second set of matrices associated with the load prediction module for storing energy usage prediction information.

3. The system of claim 2, wherein the first set of matrices includes an information matrix for storing update coefficients for determining periodic changes in energy load usage, and a model parameter matrix for storing load parameter information for determining energy usage load forecast profiles.

4. The system of claim 3, wherein the periodic changes are determined hourly.

5. The system of claim 3, wherein the information matrix is a 24×3×3×3 matrix.

6. The system of claim 3, wherein the model parameter matrix is a 24×3×3 matrix.

7. The system of claim 1, wherein the database further includes a forecast table for relating main forecast points, indicating existing metered load points for which an energy usage load forecast profile can be generated, with respective dependent forecast points, a weather information database, and a forecast history database.

8. The system of claim 7, wherein the respective dependent forecast points include at least one of a calculated forecast point indicating a predicted energy usage load, an hourly weather point indicating hourly temperatures for a location of interest, and a forecast weather point indicating minimum and maximum temperature measurement information.

9. The system of claim 1, wherein the load forecasting application further includes a report module for enabling the generating and viewing of energy usage load forecast profiles.

10. The system of claim 9, wherein the energy usage load forecast profiles are customizable.

11. A method for forecasting energy usage load for a facility for a selected forecast day, comprising the steps of:
generating a forecast table for relating main forecast points for which an energy usage load forecast profile can be generated, with respective dependent forecast points that can be used to determine an energy usage load forecast profile for the facility, the respective dependent forecast points including at least one of:
a prior generated energy usage load forecast profile for the facility;
minimum and maximum temperature measurements for the selected forecast day; and
periodic energy usage load information for the facility;
generating an energy usage load forecast profile for the facility for the selected forecast day based on the main forecast points and the respective dependent forecast points; and
adjusting the energy usage load forecast profile so that the average value of the energy usage load forecast profile is similar to that of a calculated average temperature of the selected forecast day.

12. The method of claim 11, further comprising updating the periodic energy usage load information hourly.

13. The method of claim 12, wherein the updating step includes the steps of retrieving current energy usage load information for the facility and retrieving current temperature information; determining the effect of measured weather-related perturbations on predicted energy load usage for the facility for the selected forecast day; retrieving historical parameter information relating to prior periodic energy usage load information for the facility; and updating the periodic energy usage load information for the facility with current energy usage load information for the facility.

14. A system for forecasting energy usage load, comprising:
a plurality of facilities having one or more energy using devices therein, the plurality of facilities including one or more client computer systems for communicating over a network;
a server being connected to the one or more client computer systems over the network, the server having a load forecasting application running thereon for receiving an energy usage load forecast profile request from a requesting facility wherein the requesting facility is at least one of the plurality of facilities, and for generating a resulting energy usage load forecast profile in response thereto, the load forecasting application including a parameter identification module for determining periodic energy load usage for the requesting facility, and a load prediction module for generating a resulting energy usage load forecast profile for the requesting facility; and
a database associated with the server for storing load forecasting information therein,
wherein the database includes respective sets of matrices associated with the parameter identification module and the load prediction module.

15. The system of claim 14, wherein the load forecasting application further includes a report module for enabling the generating and viewing of energy usage load forecast profiles.

16. A computer program product for use in generating energy usage load forecast profiles for a facility for a selected forecast day, comprising:
instructions contained on the computer program product for generating a parameter identifier for determining periodic energy load usage of the facility, and
instructions contained on the computer program product for generating a load predictor for generating energy usage load forecast profiles for the facility, the energy usage load forecast profiles being adjusted periodically to reflect changing conditions, wherein a first set of matrices is associated with the parameter identifier, the first set of matrices including:
an information matrix for storing update coefficients for determining periodic changes in energy load usage of the facility, and
a model parameter matrix for storing load parameter information for determining energy usage load forecast profiles for the facility.

17. The computer program product of claim 16, wherein an energy usage load forecast profile is determined according to the following algorithm $$\begin{cases} e = a + bD_c + cD_h = \theta^T \Phi \\ \theta = [\begin{matrix} a & b & (c) \end{matrix}]^T \\ \Phi = [\begin{matrix} 1 & D_c & D_h \end{matrix}]^T \end{cases}$$

where e indicates an energy usage load forecast profile, a indicates a base value of energy usage load at the facility, b indicates the rate of air temperature cooling over time, c indicates the rate of air temperature heating over time, T indicates current temperature, θ indicates a parameter vector determined from the information matrix, and Φ indicates a weather-related perturbation vector determined from the model parameter matrix, and wherein $D_c$ and $D_h$ respectively indicate the weather classification (cool or hot) for the selected forecast day as determined according to the following algorithm $$D_c = \max\{0, T_{ext} - T_{ref}\}$$

$$D_h = \max\{0, T_{ref} - T_{ext}\}$$

where $T_{ext}$ indicates current external temperature and $T_{ref}$ indicates a reference temperature for distinguishing between a cool and a hot forecast day.

18. The computer program product of claim 17, wherein the information matrix is updated periodically according to the following algorithm $$\begin{cases} \theta(t) = \theta(t-1) + P(t)\Phi(t)\{e(t) - \theta^T(t-1)\Phi(t)\} \\ P(t) = P(t-1) - \dfrac{P(t-1)\Phi(t)\Phi^T(t)P(t-1)}{1 + \Phi^T(t)P(t-1)\Phi(t)} \end{cases}$$

where θ(t) is θ at time t, and P(t) indicates the information matrix at time t.

19. The computer program product of claim 17, wherein the information matrix is updated hourly according to the following algorithm $$\begin{cases} \theta_{ij}(new) = \theta_{ij}(old) + P_{ij}(new)\Phi(t)\{e(t) - \theta_{ij}^T(old)\Phi(t)\} \\ P_{ij}(new) = P_{ij}(old) - \dfrac{P_{ij}(old)\Phi(t)\Phi^T(t)P_{ij}(old)}{1 + \Phi^T(t)P_{ij}(old)\Phi(t)} \end{cases}$$

where e and Φ are measured values at time t, i indicates day type, and j indicates hour-of-day.

* * * * *